(12) United States Patent
Chen et al.

(10) Patent No.: US 9,871,636 B2
(45) Date of Patent: Jan. 16, 2018

(54) ENHANCED CONTROL CHANNEL ELEMENT (ECCE) BASED PHYSICAL DOWNLINK SHARED CHANNEL (PDSCH) RESOURCE ALLOCATION FOR LONG-TERM EVOLUTION (LTE)

(71) Applicant: QUALCOMM Incorporated, San Diego, CA (US)

(72) Inventors: Wanshi Chen, San Diego, CA (US); Tingfang Ji, San Diego, CA (US); Hao Xu, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 374 days.

(21) Appl. No.: 14/085,627

(22) Filed: Nov. 20, 2013

(65) Prior Publication Data

US 2014/0204849 A1  Jul. 24, 2014

Related U.S. Application Data

(60) Provisional application No. 61/754,489, filed on Jan. 18, 2013.

(51) Int. Cl.
*H04L 5/00* (2006.01)
*H04L 5/14* (2006.01)

(52) U.S. Cl.
CPC .......... *H04L 5/0053* (2013.01); *H04L 5/0044* (2013.01); *H04L 5/0094* (2013.01);
(Continued)

(58) Field of Classification Search
CPC ... H04L 5/0053; H04L 5/0044; H04L 5/0094; H04L 5/0023; H04L 5/001; H04L 5/005; H04L 5/14; H04L 5/0082
(Continued)

(56) References Cited

U.S. PATENT DOCUMENTS

2009/0010240 A1* 1/2009 Papasakellariou .... H04L 5/0007
370/344
2011/0243075 A1* 10/2011 Luo ..................... H04W 74/004
370/329
(Continued)

FOREIGN PATENT DOCUMENTS

CN        102265677 A     11/2011
EP        2509380 A1      10/2012
(Continued)

OTHER PUBLICATIONS

International Search Report and Written Opinion—PCT/US2013/071157—ISA/EPO—dated Feb. 19, 2014.
(Continued)

*Primary Examiner* — Michael Thier
*Assistant Examiner* — Rownak Islam
(74) *Attorney, Agent, or Firm* — Patterson & Sheridan, L.L.P.

(57) ABSTRACT

Aspects of the present disclosure provide techniques and apparatus for enhanced control channel element (ECCE) based physical downlink shared channel (PDSCH) resource allocation for long-term evolution (LTE). A method is provided for wireless communications by a user equipment (UE). The method generally includes determining resources assigned for a data channel, based on a resource granularity associated with a control channel and processing the data channel transmissions in a subframe based on the determination. The data channel may comprise a PDSCH. According to certain aspects, the UE may receive downlink control information (DCI) having a number of bits indicating VRBs assigned for PDSCH. Each VRB may include ECCEs from the same or different enhanced resource element group (EREG). ECCEs may span multiple PRB pairs or the same PRB pair. The UE may perform rate matching around
(Continued)

enhanced physical downlink control channel (EPDCCH) overlapping assigned PDSCH resources.

28 Claims, 14 Drawing Sheets

(52) U.S. Cl.
CPC .............. *H04L 5/001* (2013.01); *H04L 5/005* (2013.01); *H04L 5/0023* (2013.01); *H04L 5/0082* (2013.01); *H04L 5/14* (2013.01)

(58) Field of Classification Search
USPC .......................................................... 370/329
See application file for complete search history.

(56) References Cited

U.S. PATENT DOCUMENTS

| | | | |
|---|---|---|---|
| 2012/0087331 A1* | 4/2012 | Seo ....................... | H04L 5/0044 370/329 |
| 2013/0003639 A1* | 1/2013 | Noh ....................... | H04L 5/0053 370/312 |
| 2013/0064216 A1 | 3/2013 | Gao et al. | |
| 2013/0100901 A1* | 4/2013 | Shan ...................... | H04L 5/0048 370/329 |
| 2013/0114525 A1 | 5/2013 | Ahmadi | |
| 2013/0188577 A1 | 7/2013 | Papasakellariou et al. | |
| 2013/0215842 A1* | 8/2013 | Han .................... | H04W 72/042 370/329 |
| 2013/0242817 A1 | 9/2013 | He et al. | |
| 2013/0242904 A1 | 9/2013 | Sartori et al. | |
| 2013/0301562 A1* | 11/2013 | Liao .................... | H04W 72/042 370/329 |
| 2014/0092822 A1* | 4/2014 | Koorapaty ............ | H04L 5/0039 370/329 |
| 2014/0092830 A1* | 4/2014 | Chen ................... | H04W 72/042 370/329 |
| 2014/0112283 A1* | 4/2014 | Kim ..................... | H04L 5/0053 370/329 |

FOREIGN PATENT DOCUMENTS

| | | | | |
|---|---|---|---|---|
| EP | 2584731 A2 | 4/2013 | | |
| FI | WO 2013173967 A1 | * 11/2013 | ........ | H04W 72/0406 |
| KR | WO 2013002573 A2 | * 1/2013 | ............ | H04L 5/001 |
| WO | WO 2013173967 A1 | * 11/2013 | ............ | H04W 72/04 |

OTHER PUBLICATIONS

Alcatel-Lucent., et al, "Design details for enhanced PDCCH", 3GPP TSG-RAN WG1#66bis, R1-113322, Oct. 14, 2011, International Publication No. 2012/161082, 5 pages. URL: http://www.3gpp.org/ftp/tsg_ran/WG1_RL1/TSGR1_66b/Docs/R1-113322.zip.

* cited by examiner

| Tone Index | Symbol Index | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | 0 | 12 | 8 | 4 | 0 | ░ | ░ | 8 | 4 | 0 | 12 | 8 | ░ | ░ |
| 1 | 1 | 13 | 9 | 5 | 1 | ░ | ░ | 9 | 5 | 1 | 13 | 9 | ░ | ░ |
| 2 | 2 | 14 | 10 | 6 | 2 | 12 | 2 | 10 | 6 | 2 | 14 | 10 | 4 | 10 |
| 3 | 3 | 15 | 11 | 7 | 3 | 13 | 3 | 11 | 7 | 3 | 15 | 11 | 5 | 11 |
| 4 | 4 | 0 | 12 | 8 | 4 | 14 | 4 | 12 | 8 | 4 | 0 | 12 | 6 | 12 |
| 5 | 5 | 1 | 13 | 9 | 5 | ░ | ░ | 13 | 9 | 5 | 1 | 13 | ░ | ░ |
| 6 | 6 | 2 | 14 | 10 | 6 | ░ | ░ | 14 | 10 | 6 | 2 | 14 | ░ | ░ |
| 7 | 7 | 3 | 15 | 11 | 7 | ░ | ░ | 15 | 11 | 7 | 3 | 15 | ░ | ░ |
| 8 | 8 | 4 | 0 | 12 | 8 | 15 | 5 | 0 | 12 | 8 | 4 | 0 | 7 | 13 |
| 9 | 9 | 5 | 1 | 13 | 9 | 0 | 6 | 1 | 13 | 9 | 5 | 1 | 8 | 14 |
| 10 | 10 | 6 | 2 | 14 | 10 | 1 | 7 | 2 | 14 | 10 | 6 | 2 | 9 | 15 |
| 11 | 11 | 7 | 3 | 15 | 11 | ░ | ░ | 3 | 15 | 11 | 7 | 3 | ░ | ░ |

*FIG. 5*

| PRB pair j | 0 | 1 | 2 | 3 | 4 | 5 | 6 | 7 | 8 | 9 | 10 | 11 | 12 | 13 | 14 | 15 |

*FIG. 6*

| | ECCE indexing | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| PRB pair 0 | 0 | 12 | 8 | 4 | 1 | 13 | 9 | 5 | 2 | 14 | 10 | 6 | 3 | 15 | 11 | 7 |
| PRB pair 1 | 4 | 0 | 12 | 8 | 5 | 1 | 13 | 9 | 6 | 2 | 14 | 10 | 7 | 3 | 15 | 11 |
| PRB pair 2 | 8 | 4 | 0 | 12 | 9 | 5 | 1 | 13 | 10 | 6 | 2 | 14 | 11 | 7 | 3 | 15 |
| PRB pair 3 | 12 | 8 | 4 | 0 | 13 | 9 | 5 | 1 | 14 | 10 | 6 | 2 | 15 | 11 | 7 | 3 |

*FIG. 7*

| | ECCE indexing | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| PRB pair 0 | 0 | 1 | 2 | 3 | 4 | 5 | 6 | 7 | 8 | 9 | 10 | 11 | 12 | 13 | 14 | 15 |
| PRB pair 1 | 0 | 12 | 8 | 4 | 1 | 13 | 9 | 5 | 2 | 14 | 10 | 6 | 3 | 15 | 11 | 7 |
| PRB pair 2 | 4 | 0 | 12 | 8 | 5 | 1 | 13 | 9 | 6 | 2 | 14 | 10 | 7 | 3 | 15 | 11 |
| PRB pair 3 | 8 | 4 | 0 | 12 | 9 | 5 | 1 | 13 | 10 | 6 | 2 | 14 | 11 | 7 | 3 | 15 |
| | Virtual Resource Block 0 for PDSCH | | | | Virtual Resource Block 1 for PDSCH | | | | Virtual Resource Block 2 for PDSCH | | | | Virtual Resource Block 3 for PDSCH | | | |

| | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|---|---|---|---|---|---|---|---|---|
| | | | | | | | | | | | | | | | | | | | | | | | | |
| PRB pair 0 | 0 | 12 | | 8 | 4 | | | | | | | | | 14 | | 10 | 6 | | 3 | 15 | | 11 | 7 | |
| PRB pair 1 | | 0 | 12 | | 8 | 4 | 1 | 13 | | 9 | 5 | | 2 | | 14 | 10 | | 6 | 15 | 3 | | 7 | 11 | 7 |
| PRB pair 2 | 4 | | 0 | 12 | | 8 | 5 | 1 | 13 | | 9 | | 6 | 2 | | 14 | 10 | | 7 | 3 | 15 | | 11 | 11 |
| PRB pair 3 | 8 | 4 | | 0 | 12 | | 9 | 5 | 1 | 13 | | | 10 | 6 | 2 | | 14 | | 11 | 7 | 3 | 15 | | |
| PRB pair 4 | | 8 | 4 | | 0 | 12 | | 9 | 5 | 1 | 13 | | | 10 | 6 | 2 | | 14 | 15 | 11 | 7 | 3 | 15 | 3 |
| PRB pair 5 | 12 | | 8 | 4 | | 0 | 13 | | 9 | 5 | 1 | 13 | 14 | | 10 | 6 | 2 | | 15 | | 11 | 7 | 3 | |

ECCE indexing

{ VRB 0 for PDSCH } { VRB 1 for PDSCH } { VRB 2 for PDSCH } { VRB 3 for PDSCH }

FIG. 10

| | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|---|---|---|---|---|---|---|---|---|
| PRB pair 0 | 0 | 12 | | 8 | 4 | | | | | | | | | 14 | | 10 | 6 | | 3 | 15 | | 11 | 7 | |
| PRB pair 1 | | 0 | 12 | | 8 | 4 | 1 | 13 | | 9 | 5 | | 2 | | 14 | 10 | | 6 | 15 | 3 | | 7 | 11 | 7 |
| PRB pair 2 | 4 | | 0 | 12 | | 8 | 5 | 1 | 13 | | 9 | | 6 | 2 | | 14 | 10 | | 7 | 3 | 15 | | 11 | 11 |
| PRB pair 3 | 8 | 4 | | 0 | 12 | | 9 | 5 | 1 | 13 | | | 10 | 6 | 2 | | 14 | | 11 | 7 | 3 | 15 | | |
| PRB pair 4 | | 8 | 4 | | 0 | 12 | | 9 | 5 | 1 | 13 | | | 10 | 6 | 2 | | 14 | 15 | 11 | 7 | 3 | 15 | 3 |
| PRB pair 5 | 12 | | 8 | 4 | | 0 | 13 | | 9 | 5 | 1 | 13 | 14 | | 10 | 6 | 2 | | 15 | | 11 | 7 | 3 | |

ECCE indexing

{ VRB 0 for PDSCH } { VRB 1 for PDSCH } { VRB 2 for PDSCH } { VRB 3 for PDSCH } { VRB 4 for PDSCH } { VRB 5 for PDSCH } { VRB 6 for PDSCH } { VRB 7 for PDSCH }

ENHANCED CONTROL CHANNEL ELEMENT (ECCE) BASED PHYSICAL DOWNLINK SHARED CHANNEL (PDSCH) RESOURCE ALLOCATION FOR LONG-TERM EVOLUTION (LTE)

CLAIM OF PRIORITY UNDER 35 U.S.C. §119

This application claims benefit of U.S. Provisional Patent Application Ser. No. 61/754,489, filed Jan. 18, 2013, which is herein incorporated by reference in its entirety.

BACKGROUND

I. Field

Certain aspects of the present disclosure generally relate to wireless communications and, more particularly, to techniques and apparatus for Enhanced Control Channel Element (ECCE) based physical downlink shared channel (PDSCH) resource allocation for long-term evolution (LTE).

II. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3rd Generation Partnership Project (3GPP) Long Term Evolution (LTE) including LTE-Advanced systems and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output, multiple-input single-output or a multiple-input multiple-output (MIMO) system.

SUMMARY

Certain aspects of the present disclosure generally relate to enhanced control channel element (ECCE) based physical downlink shared channel (PDSCH) resource allocation for long-term evolution (LTE).

Certain aspects of the present disclosure provides a method for wireless communications by a user equipment (UE). The method generally includes determining resources assigned for a data channel, based on a resource granularity associated with a control channel and processing the data channel transmissions in a subframe based on the determination.

Certain aspects of the present disclosure provide a method for wireless communications by a base station (BS). The method generally includes assigning resources for a data channel for a user equipment (UE), based on a resource granularity associated with a control channel; and sending the data channel transmissions in a subframe based on the assignment.

Certain aspects of the present disclosure provides an apparatus for wireless communications by a user equipment (UE). The apparatus generally includes means for determining resources assigned for a data channel, based on a resource granularity associated with a control channel, and means for processing the data channel transmissions in a subframe based on the determination.

Certain aspects of the present disclosure provide an apparatus for wireless communications by a base station (BS). The apparatus generally includes means for assigning resources for a data channel for a user equipment (UE), based on a resource granularity associated with a control channel, and means for sending the data channel transmissions in a subframe based on the assignment.

Certain aspects of the present disclosure also provide apparatuses and program products for performing the operations described above.

For example, an apparatus for wireless communications may include a processor configured to determine resources assigned for a data channel, based on a resource granularity associated with a control channel, and to process data channel transmissions in a subframe based on the determination. As another example, an apparatus for wireless communications may include a processor configured to assign resources for a data channel for a user equipment, based on a resource granularity associated with a control channel, and to send the data channel transmissions in a subframe based on the assignment. As another example, a computer program product may comprise a computer readable medium, the computer readable medium may comprise code to determine resources assigned for a data channel, based on a resource granularity associated with a control channel, and code to process data channel transmissions in a subframe based on the determination. As yet another example, a computer program product may comprise a computer readable medium, the computer readable medium may comprise code to assign resources for a data channel for a user equipment, based on a resource granularity associated with a control channel, and code to send the data channel transmissions in a subframe based on the assignment.

BRIEF DESCRIPTION OF THE DRAWINGS

FIG. 5 illustrates example EREGs in a PRB pair for EPDCCH, in accordance with certain aspects of the present disclosure.

FIG. 6 illustrates example EREGs in a PRB pair for localized EPDCCH, in accordance with certain aspects of the present disclosure.

FIG. 7 illustrates example ECCE indexing, in accordance with certain aspects of the present disclosure.

FIG. 8 illustrates example ECCE based PDSCH resource allocation, in accordance with certain aspects of the present disclosure.

FIG. 9 illustrates example ECCE based PDSCH resource allocation for six PRB pairs, in accordance with certain aspects of the present disclosure.

FIG. 10 illustrates example ECCE based PDSCH resource allocation for six PRB pairs, in accordance with certain aspects of the present disclosure.

DETAILED DESCRIPTION

Aspects of the present disclosure provide techniques and apparatus for enhancing control channel element (ECCE) based physical downlink shared channel (PDSCH) resource allocation for long-term evolution (LTE). According to certain aspects, the user equipment (UE) may receive downlink control information (DCI) having a number of bit indicating virtual resource blocks (VRBs) assigned for PDSCH. Each VRB may include ECCEs from the same or different enhanced resource element group (EREG). ECCEs may span multiple physical resource block (PRB) pairs or the same PRB pair. The UE may perform rate matching around enhanced physical downlink control channel (EPDCCH) overlapping assigned PDSCH resources.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "network" and "system" are often used interchangeably. A CDMA network may implement a radio technology such as Universal Terrestrial Radio Access (UTRA), cdma2000, etc. UTRA includes Wideband-CDMA (W-CDMA), Time Division Synchronous CDMA (TD-SCDMA), and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A), in both frequency division duplex (FDD) and time division duplex (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE/LTE-A, and LTE/LTE-A terminology is used in much of the description below, and for simplicity, LTE refers to LTE/LTE-A.

Example Wireless Communications System

Figure 1:
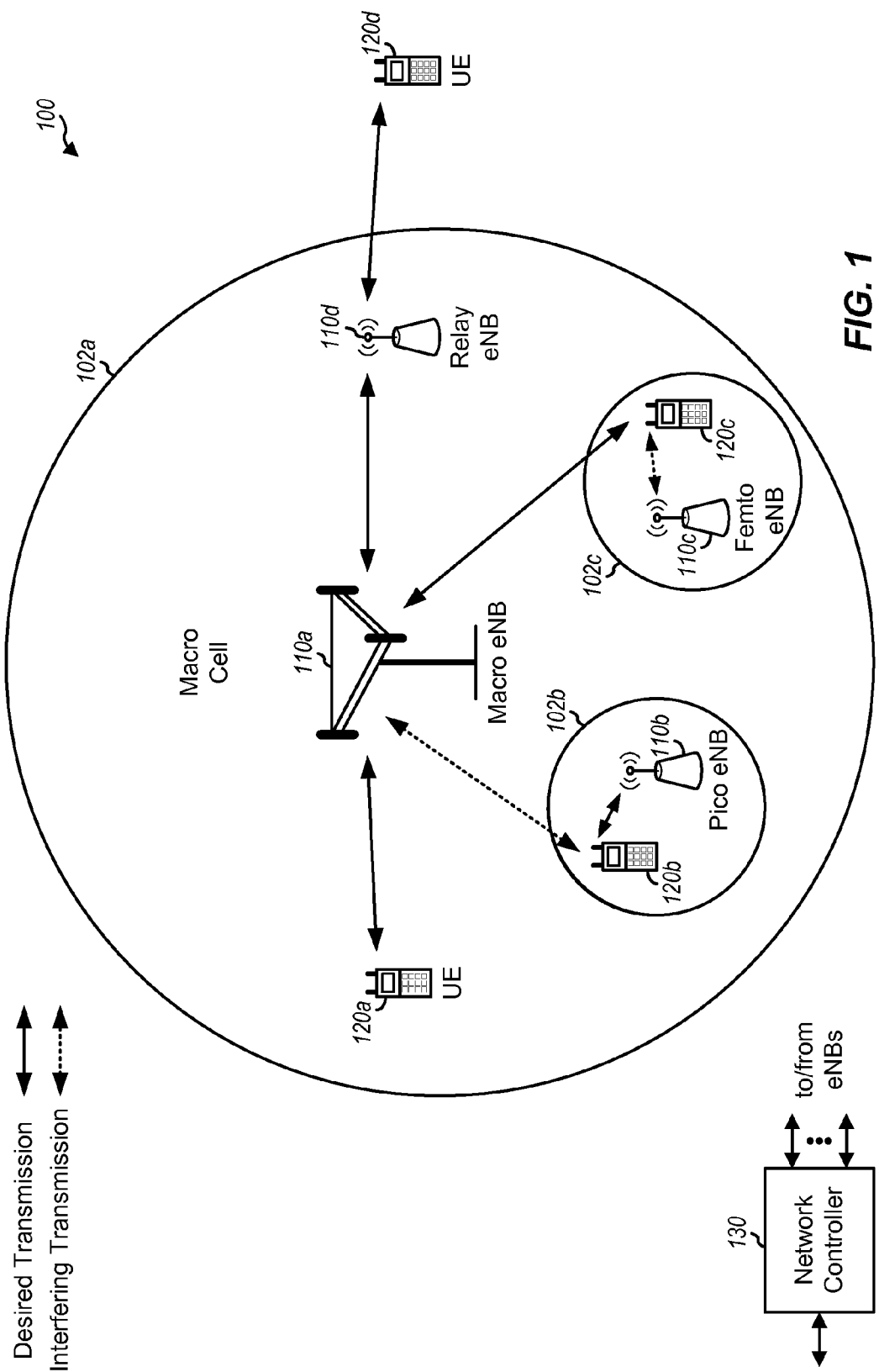
FIG. 1 is a block diagram conceptually illustrating an example wireless communication network, in accordance with certain aspects of the present disclosure.

FIG. 1 shows a wireless communication network 100, which may be an LTE network or some other wireless network. Wireless network 100 may include a number of evolved Node Bs (eNBs) 110 and other network entities. An eNB is an entity that communicates with user equipments (UEs) and may also be referred to as a base station, a Node B, an access point (AP), etc. Each eNB may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). An eNB for a macro cell may be referred to as a macro eNB. An eNB for a pico cell may be referred to as a pico eNB. An eNB for a femto cell may be referred to as a femto eNB or a home eNB (HeNB). In the example shown in FIG. 1, an eNB 110a may be a macro eNB for a macro cell 102a, an eNB 110b may be a pico eNB for a pico cell 102b, and an eNB 110c may be a femto eNB for a femto cell 102c. An eNB may support one or multiple (e.g., three) cells. The terms "eNB", "base station," and "cell" may be used interchangeably herein.

Wireless network 100 may also include relay stations. A relay station is an entity that can receive a transmission of data from an upstream station (e.g., an eNB or a UE) and send a transmission of the data to a downstream station (e.g., a UE or an eNB). A relay station may also be a UE that can relay transmissions for other UEs. In the example shown in FIG. 1, a relay station 110d may communicate with macro eNB 110a and a UE 120d in order to facilitate communication between eNB 110a and UE 120d. A relay station may also be referred to as a relay eNB, a relay base station, a relay, etc.

Wireless network 100 may be a heterogeneous network that includes eNBs of different types, e.g., macro eNBs, pico eNBs, femto eNBs, relay eNBs, etc. These different types of eNBs may have different transmit power levels, different coverage areas, and different impact on interference in wireless network 100. For example, macro eNBs may have a high transmit power level (e.g., 5 to 40 W) whereas pico eNBs, femto eNBs, and relay eNBs may have lower transmit power levels (e.g., 0.1 to 2 W).

A network controller 130 may couple to a set of eNBs and may provide coordination and control for these eNBs. Network controller 130 may communicate with the eNBs via a backhaul. The eNBs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station (MS), a subscriber unit, a station (STA), etc. A UE may be a cellular phone, a personal digital assistant (PDA), a wireless modem, a wireless communication device, a handheld device, a laptop computer, a cordless phone, a wireless local loop (WLL) station, a tablet, a smart phone, a netbook, a smartbook, an ultrabook, etc.

Figure 2:
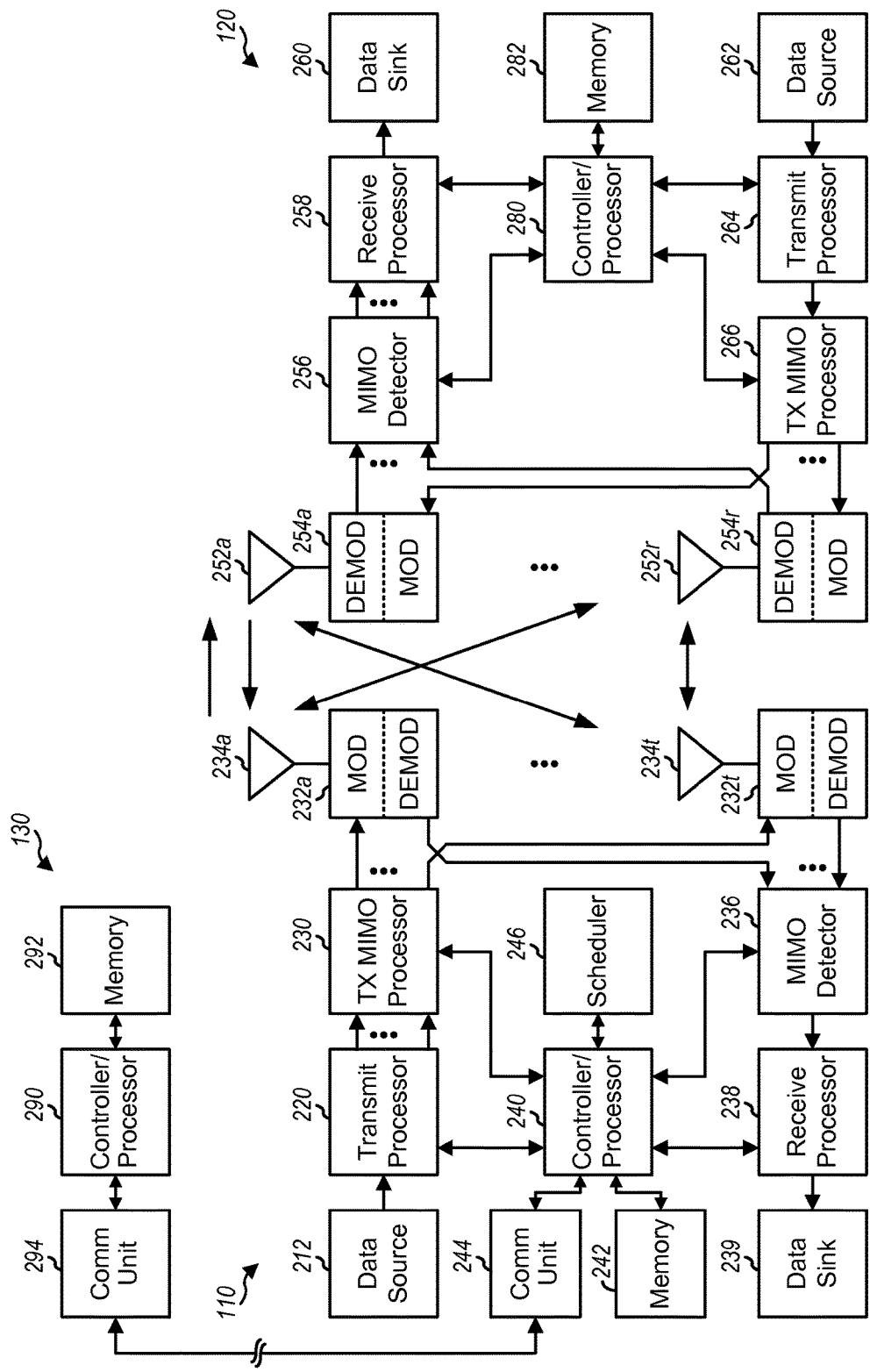
FIG. 2 is a block diagram conceptually illustrating an example of an evolved node B (eNB) in communication with a user equipment (UE) in a wireless communications network, in accordance with certain aspects of the present disclosure.

FIG. 2 is a block diagram of a design of base station/eNB 110 and UE 120, which may be one of the base stations/eNBs and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCSs) for each UE based on channel quality indicators (CQIs) received from the UE, process (e.g., encode and modulate) the data for each UE based on the MCS(s) selected for the UE, and provide data symbols for all UEs. Transmit processor 220 may also process system information (e.g., for semi-static resource partitioning information (SRPI), etc.) and control information (e.g., CQI requests, grants, upper layer signaling, etc.) and provide overhead symbols and control symbols. Processor 220 may also generate reference symbols for reference signals (e.g., the common reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) it's received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), CQI, etc.

On the uplink, at UE 120, a transmit processor 264 may receive and process data from a data source 262 and control information (e.g., for reports comprising RSRP, RSSI, RSRQ, CQI, etc.) from controller/processor 280. Processor 264 may also generate reference symbols for one or more reference signals. The symbols from transmit processor 264 may be precoded by a TX MIMO processor 266 if applicable, further processed by modulators 254a through 254r (e.g., for SC-FDM, OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controllers/processors 240 and 280 may direct the operation at base station 110 and UE 120, respectively. Processor 240 and/or other processors and modules at base station 110, and/or processor 280 and/or other processors and modules at UE 120, may perform or direct processes for the techniques described herein. Memories 242 and 282 may store data and program codes for base station 110 and UE 120, respectively. A scheduler 246 may schedule UEs for data transmission on the downlink and/or uplink.

When transmitting data to the UE 120, the base station 110 may be configured to determine a bundling size based at least in part on a data allocation size and precode data in bundled contiguous resource blocks of the determined bundling size, wherein resource blocks in each bundle may be precoded with a common precoding matrix. That is, reference signals (RSs) such as UE-RS and/or data in the resource blocks may be precoded using the same precoder. The power level used for the UE-RS in each resource block (RB) of the bundled RBs may also be the same.

The UE 120 may be configured to perform complementary processing to decode data transmitted from the base station 110. For example, the UE 120 may be configured to determine a bundling size based on a data allocation size of received data transmitted from a base station in bundles of contiguous RBs, wherein at least one reference signal in resource blocks in each bundle are precoded with a common precoding matrix, estimate at least one precoded channel based on the determined bundling size and one or more RSs transmitted from the base station, and decode the received bundles using the estimated precoded channel.

Figure 3:
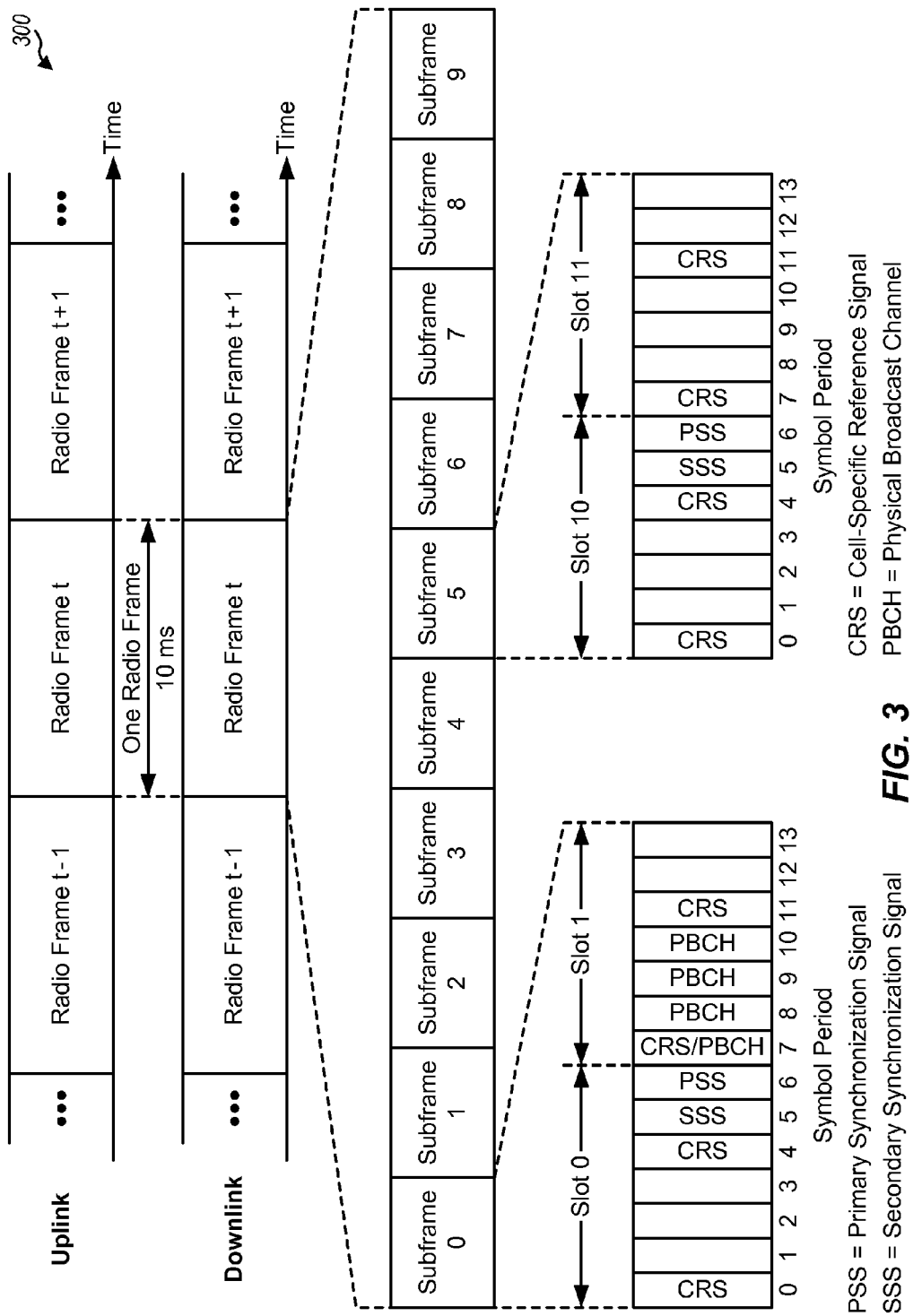
FIG. 3 is a block diagram conceptually illustrating an example frame structure for a particular radio access technology (RAT) for use in a wireless communications network, in accordance with certain aspects of the present disclosure.

FIG. 3 shows an exemplary frame structure 300 for FDD (frequency division duplex) in LTE. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 3) or six symbol periods for an extended cyclic prefix. The 2L symbol periods in each subframe may be assigned indices of 0 through 2L−1.

In LTE, an eNB may transmit a primary synchronization signal (PSS) and a secondary synchronization signal (SSS) on the downlink in the center 1.08 MHz of the system bandwidth for each cell supported by the eNB. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The eNB may transmit a cell-specific reference signal (CRS) across the system bandwidth for each cell supported by the eNB. The CRS may be transmitted in certain symbol periods of each subframe and may be used by the UEs to perform channel estimation, channel quality measurement, and/or other functions. The eNB may also transmit a physical broadcast channel (PBCH) in symbol periods 0 to 3 in slot 1 of certain radio frames. The PBCH may carry some system information. The eNB may transmit other system information such as system information blocks (SIBs) on a physical downlink shared channel (PDSCH) in certain subframes. The eNB may transmit control information/data on a physical downlink control channel (PDCCH) in the first B symbol periods of a subframe, where B may be configurable for each subframe. The eNB may transmit traffic data and/or other data on the PDSCH in the remaining symbol periods of each subframe.

The PSS, SSS, CRS, and PBCH in LTE are described in 3GPP TS 36.211, entitled "Evolved Universal Terrestrial Radio Access (E-UTRA); Physical Channels and Modulation," which is publicly available.

Figure 4:
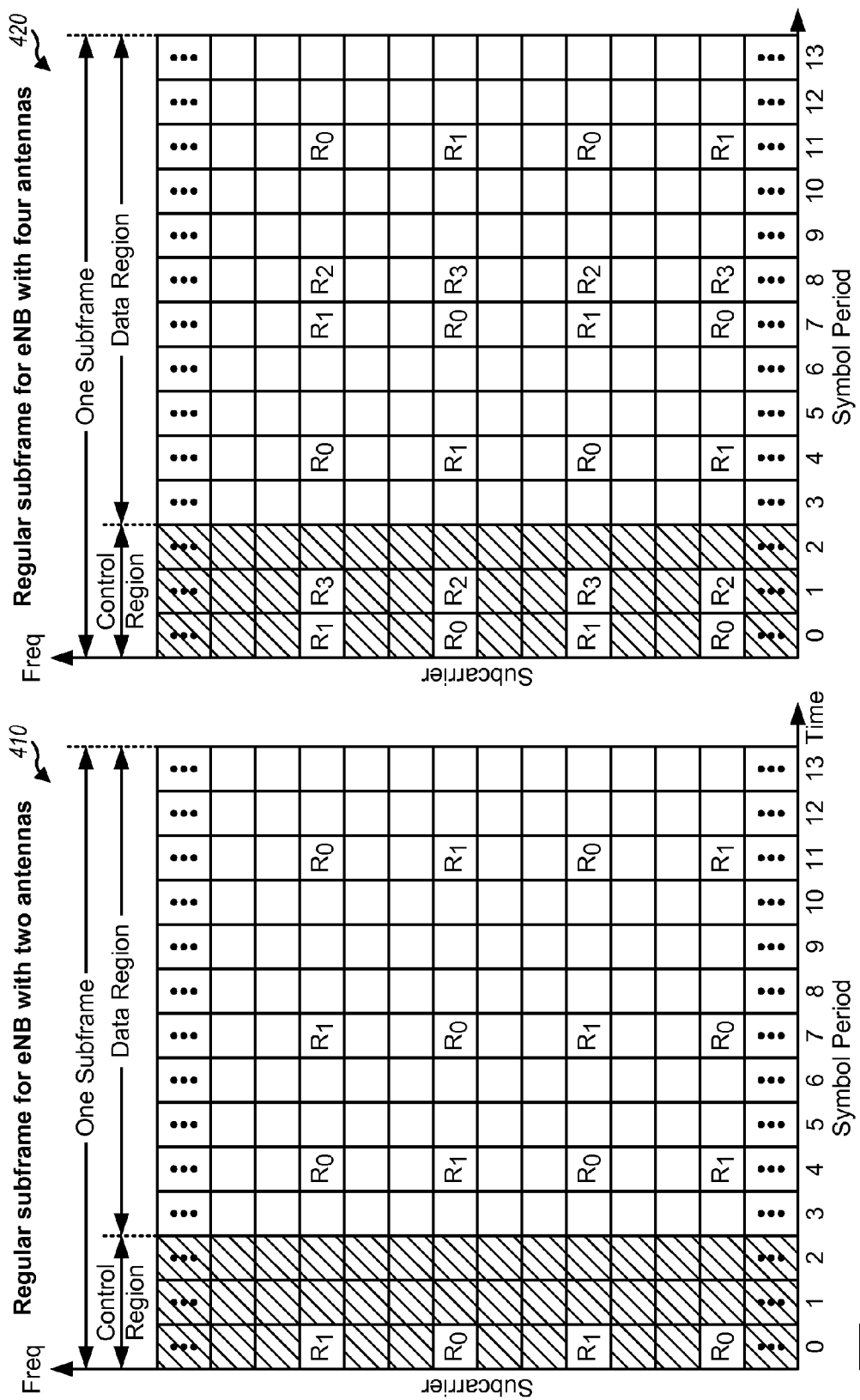
FIG. 4 illustrates two example subframe formats for the downlink with a normal cyclic prefix, in accordance with certain aspects of the present disclosure.

FIG. 4 shows two example subframe formats 410 and 420 for the downlink with a normal cyclic prefix. The available time frequency resources for the downlink may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for an eNB equipped with two antennas. A CRS may be transmitted from antennas 0 and 1 in symbol periods 0, 4, 7, and 11. A reference signal is a signal that is known a priori by a transmitter and a receiver and may also be referred to as pilot. A CRS is a reference signal that is specific for a cell, e.g., generated based on a cell identity (ID). In FIG. 4, for a given resource element with label Ra, a modulation symbol may be transmitted on that resource element from antenna a, and no modulation symbols may be transmitted on that resource element from other antennas. Subframe format 420 may be used for an eNB equipped with four antennas. A CRS may be transmitted from antennas 0 and 1 in symbol periods 0, 4, 7, and 11 and from antennas 2 and 3 in symbol periods 1 and 8. For both subframe formats 410 and 420, a CRS may be transmitted on evenly spaced subcarriers, which may be determined based on cell ID. Different eNBs may transmit their CRSs on the same or different subcarriers, depending on their cell IDs. For both subframe formats 410 and 420, resource elements not used for the CRS may be used to transmit data (e.g., traffic data, control data, and/or other data).

An interlace structure may be used for each of the downlink and uplink for FDD in LTE. For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where q∈{0, . . . , Q−1}.

The wireless network may support hybrid automatic retransmission request (HARQ) for data transmission on the downlink and uplink. For HARQ, a transmitter (e.g., an eNB 110) may send one or more transmissions of a packet until the packet is decoded correctly by a receiver (e.g., a UE 120) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple eNBs. One of these eNBs may be selected to serve the UE. The serving eNB may be selected based on various criteria such as received signal strength, received signal quality, path loss, etc. Received signal quality may be quantified by a signal-to-interference-plus-noise ratio (SINR), or a reference signal received quality (RSRQ), or some other metric. The UE may operate in a dominant interference scenario in which the UE may observe high interference from one or more interfering eNBs.

Enhanced Control Channel Element (ECCE) Based Physical Downlink Shared Channel (PDSCH) Resource Allocation for LTE In long-term evolution (LTE) Releases 8, 9, 10, and 11, three types of resource allocation (RA) of the physical downlink shared channel (PDSCH) are supported: Type 0, Type 1, and Type 2. For, Type 0, PDSCH resources are allocated by mapping using a bitmap. Each bit in the bitmap indicates whether a particular resource block group (RBG) is scheduled for a user equipment (UE) or not scheduled the UE. There is no hopping across the two slots in a subframe. For Type 1, PDSCH resources are also bitmap mapped, each bit indicating whether a RB is scheduled for a UE or not. For Type 1, the gap between two adjacent RBs is equal to RBG. For Type 1 there is also no hopping across two slots in a subframe.

Type 2 uses contiguous resource allocation. The RA can be either physically contiguous or virtually contiguous. For physically contiguous RA (referred to as localized virtual RB (VRB) RA) the set of RBs are physically contiguous, and do not hop over two slots in a subframe. For virtually contiguous resource allocation (referred to as distributed VRB RA), the set of RBs are generally physically non-contiguous, and hop over the two slots in a subframe. Distributed VRB RA is designed to maximize frequency diversity.

In LTE Rel-8/9/10, physical downlink control channel (PDCCH) is located in the first several symbols in a subframe. PDCCH are fully distributed in the entire system bandwidth. PDCCH are time-division multiplexed (TDM) with PDSCH; effectively dividing a subframe into a control region and a data region.

In Rel-11, enhanced PDCCH (EPDCCH) is introduced. Unlike legacy PDCCH, which occupies the first several control symbols in a subframe, EPDCCH will occupy the data region, similar to PDSCH. EPDCCH helps increase control channel capacity, supports frequency-domain Inter-cell Interference Coordination (ICIC), achieves improved spatial reuse of control channel resources, supports beamforming and/or diversity, operates on the new carrier type (NCT), and in Multimedia Broadcast Multicast Service Single-Frequency Network (MBSFN) subframes coexists on the same carrier as legacy UEs.

EPDCCH is frequency-division multiplexing (FDM) based, and may have two modes: localized and distributed. For localized EPDCCH, a single precoder is applied for each PRB pair. The precoder is transparent to the UE and different precoders may be applied for different PRB pairs of the same EPDCCH candidate. For distributed EPDCCH, two precoders cycle through the allocated resources within each PRB pair.

EPDCCH is based on enhanced resource element group (EREG) and enhanced control channel element (ECCE). Each PRB pair is evenly divided into 16 EREGs, excluding the REs for demodulation reference signals (DM-RS). After excluding DM-RS, there are 144 REs/PRB pairs for normal cyclic prefix (CP) (12×14−24 DM-RS=144) and 128 REs/PRB pairs for extended CP (12×12−16 DM-RS=128), resulting in 9 REs per EREG (144/16=9) and 8 REs per EREG (128/16=8) in normal and extended CP cases, respectively.

FIG. 5 illustrates example EREGs in a PRB pair for EPDCCH, according to certain aspects of the present disclosure. As seen in FIG. 5, each box may represent an EREG. The number in each such box is the EREG index. The boxes without numbers can represent DM-RS REs. As mentioned above, each EREG occupies 9 REs. An ECCE consists of N=4 or 8 EREGs. N=4 if normal CP and normal subframe configuration, or special subframe configurations 3, 4, or 8 when the number of REs/PRB pair is large, corresponding to 4 ECCEs per PRB pair. Otherwise, N=8, corresponding to 2 ECCEs per PRB pair. As mentioned above, each PRB is evenly divided into 16 EREGs. In one example, PRB pair 0 may include tones 0-3 over symbols 0-3, PRB pair 1 may include tones 4-7 over symbols 0-3, PRB pair 2 may include tones 8-11 over symbols 0-3, and PRB pair 3 may include tones 1-4 over symbols 1-4, etc.

FIG. 6 illustrates example EREGs in a PRB pair for localized EPDCCH, in accordance with certain aspects of the present disclosure. ECCE is based on an EREG grouping concept. As shown in FIG. 6, each ECCE includes 4 EREGs. Regardless of localized or distributed EPDCCH, 4 EREG groups are formed. Group 0 contains EREGs {0, 4, 8, 12}. Group 1 contains EREGs {1, 5, 9, 13}. Group 2 contains EREGs {2, 6, 10, 14}. And Group 3 contains EREGs {3, 7, 11, 15}. When an ECCE is formed by 4 EREGs, the ECCE is formed by an EREG group. When an ECCE is formed by 8 EREGs, the ECCE is formed by two EREG groups. The two EREG groups are EREG groups 0 & 2 or 1 & 3.

The location of EREGs of an EREG group depends on EPDCCH mode. As seen in FIG. 6, for localized EPDCCH, EREGs of the same group always come from the same PRB pair when a PRB pair has 4 ECCEs. For distributed EPDCCH, EREGs of the same group come from different PRB pairs as much as possible. The detailed mapping depends on the number of PRB pairs configured for EPDCCH.

For distributed EPDCCH, each ECCE is defined across PRB pairs. For example, ECCE 0 consists of EREG 0 of PRB pair 0, EREG 4 of PRB pair 1, EREG 8 of PRB pair 2, and EREG 12 of PRB pair 3. The four PRB pairs in the example may be non-contiguous in frequency (i.e., frequency distributed). For example, with reference to FIG. 5, EREG 0 of PRB pair 0 is on tone 0, EREG 4 of PRB pair 1 is on tone 1, EREG 8 of PRB pair 2 is on tone 8, and EREG 12 of PRB pair 3 is on tone 0 of symbol 1.

FIG. 7 illustrates example ECCE indexing, in accordance with certain aspects of the present disclosure. As seen in FIG. 7, ECCE indexing is done on a group first basis in order to facilitate multiplexing localized and distributed EPDCCH in the same PRB pair. For example, distributed EPDCCH 1 is assigned ECCEs 0-3, distributed EPDCCH 2 is assigned ECCEs 4-5, and localized EPDCCH 2-3 is assigned ECCEs 8-9, respectively.

For low-cost machine type communications (MTC) UEs based on LTE, it may be desirable to reduce maximum bandwidth, utilize a single receive RF chain, reduce peak rate, reduce transmit power, and use half duplex operation. Since the intended data rate for the low cost device may be less than 100 kbps, it is possible to operate the device only at narrowband width to reduce the cost (e.g., 6 RBs).

Some issues to be resolved are how to more efficiently schedule PDSCH for MTC UEs given that MTC operates with a small bandwidth. Each PDSCH assignment for MTC may typically be small (e.g., 1 or 2 PRB pairs). MTC UEs may not operate with fast and reliable channel information feedback. For example, precoding based transmission may not be efficiently supported. Frequency diversity based PDSCH assignments may be desirable for such small size assignments.

Techniques and apparatus are provided herein for ECCE based PDSCH resource allocation for LTE.

Resource allocation for PDSCH may be based on the same construction unit used for a control channel such as EPDCCH. As an example, resource allocation for PDSCH can be based on the ECCE construction and the ECCE indexing designed for distributed EPDCCH (discussed above with reference to FIGS. 5-7). Thus, EPDCCH and PDSCH can be integrated very efficiently in narrow bandwidth.

According to certain aspects, PDSCH may be similar to an EPDCCH transmission of a certain aggregation level. In some embodiments, EPDCCH may be omitted for some or all of the PDSCH transmissions to some UEs and PDSCH decoding may be treated similar to blind EPDCCH decoding.

According to certain aspects, frequency diversity based PDSCH transmission may be enabled similar to distributed EPDCCH. Instead of RB based PDSCH resource allocation, PDSCH resource allocation may consist of resource elements from multiple PRB pairs. The minimum resource unit size for PDSCH may be equivalent to that of a PRB pair. For example, the minimum resource unit for PDSCH may be 4 ECCEs if a PRB pair contains 4 ECCEs, and 2 ECCEs if a PRB pair contains 2 ECCEs, etc. Other units are possible as well (e.g., 2 ECCEs for half a PRB pair) for different overhead and flexibility tradeoff.

FIG. 8 illustrates example ECCE based PDSCH resource allocation, in accordance with certain aspects of the present disclosure. In the example show in FIG. 8, 4 ECCEs/PRB pair is assumed. It is also assumed the resource granularity for PDSCH is 4 ECCEs and there are 4 PRB pairs. As seen in FIG. 8, each 4 ECCEs of the same group are denoted as one virtual resource block (VRB). For example, ECCEs 0-3 are denoted VRB 0, ECCEs 4-7 are denoted VRB 1, ECCEs 8-11 are denoted VRB 2, and ECCEs 12-15 are denoted VRB 3. In this example, there are four VRBs for PDSCH, where each VRB of EREGs of the same group is from 4 PRB pairs, resulting in frequency diversity order or 4.

In some embodiments, EPDCCH may use some ECCEs. If the assigned PDSCH resource overlaps with the corresponding EPDCCH, then PDSCH may rate match around the resources occupied by EPDCCH. For example, assuming a DL grant with EPDCCH using ECCEs 0 and 1 schedules PDSCH VRBs 0 and 1 (because the granularity for PDSCH is 1 VRB), the UE may then assume ECCEs 2 and 3 in VRB 0 and all ECCEs in VRB 1 are available for the PDSCH. In some embodiments, additional collision handling is possible, for example, by adding bits in downlink control information (DCI) to indicate ECCE resource availability to PDSCH.

Currently, there is no distributed EPDCCH defined for 6 PRB pairs—only for 2, 4, and 8 PRB pairs—but this may be easily extended to 6 PRB pairs. FIGS. 9-10 illustrate example ECCE based PDSCH resource allocation for six PRB pairs, in accordance with certain aspects of the present disclosure. As seen in FIG. 9, in a first alternative, the 6 PRB pairs in one subframe may be organized with one set of resources. Four VRBs may be defined for PDSCH, each including 6 ECCEs, as opposed to 4—about 1.5 PRB pairs, as opposed to 1 PRB pair.

Figure 11:
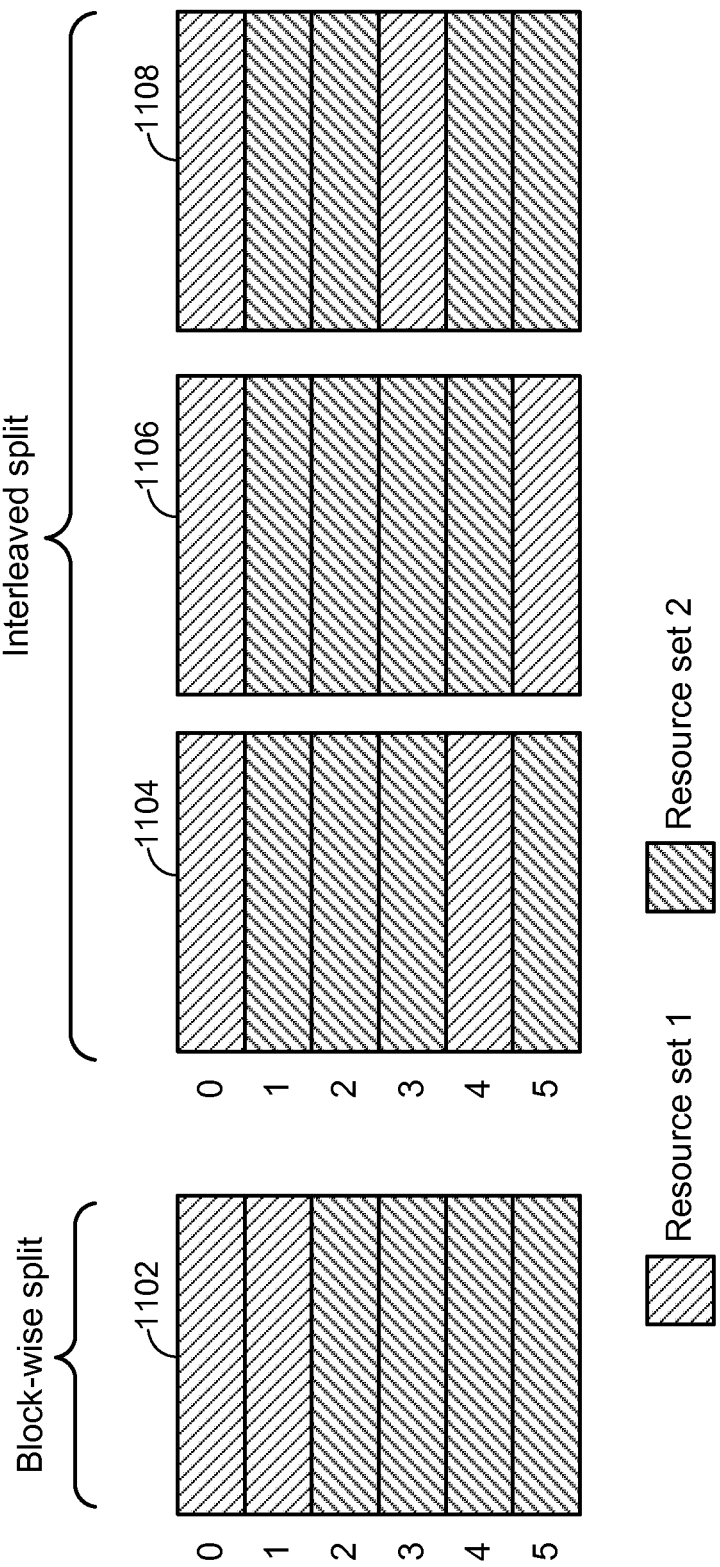
FIG. 11 illustrates PRB pairs in a subframe organized with two or more resource sets, in accordance with certain aspects of the present disclosure.

As seen in FIG. 10, in another alternative, 8 VRBs may be defined for PDSCH, each including 3 ECCEs—about 0.75 PRB pairs. In some embodiments, the 6 PRB pairs in one subframe are organized with two or more resource sets as shown in FIG. 11. As shown in FIG. 11, the 6 PRBs may be grouped into one resource set with 2 PRB pairs and a second resource set with 4 PRB pairs. The two or more sets may be split in a block-wise manner 1102 or in an interleaved manner 1104, 1106, 1108. The interleaved manner 1104, 1106, 1108 may be preferable for better frequency diversity. It is also preferable to place 2 PRB pairs on the edge (e.g., 1106) for maximum frequency diversity for the 2 PRB pairs—potentially used for carrying common search space and broadcast traffic.

Figure 12:
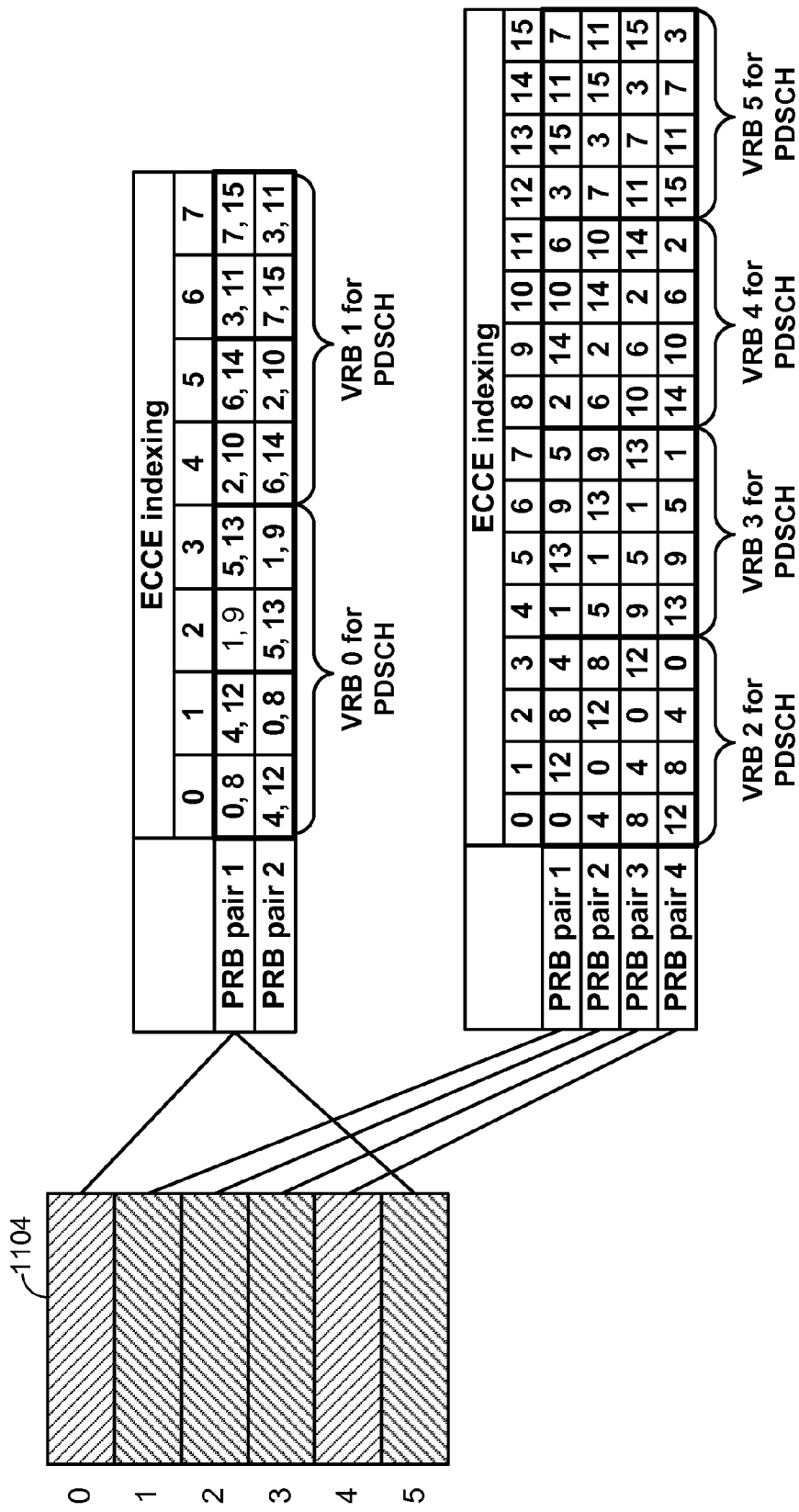
FIG. 12 illustrates example ECCE based PDSCH resource allocation for six PRB pairs organized with two resource sets, in accordance with certain aspects of the present disclosure.

In some embodiments, the VRBs for PDSCH may combine the VRBs from the two or more sets for PDSCH resource allocation as shown in the example in FIG. 12. As shown in FIG. 12, interleaved sets 1104 may include two resource sets, a first set including PRB pairs 0 and 5, and a second set including PRB pairs 1-4. PRB pairs 0 and 5 of the first set may include VRBs 0 and 1 for PDSCH and PRB pairs 1-4 of the second set may include VRBs 2-5 for PDSCH.

Figure 13:
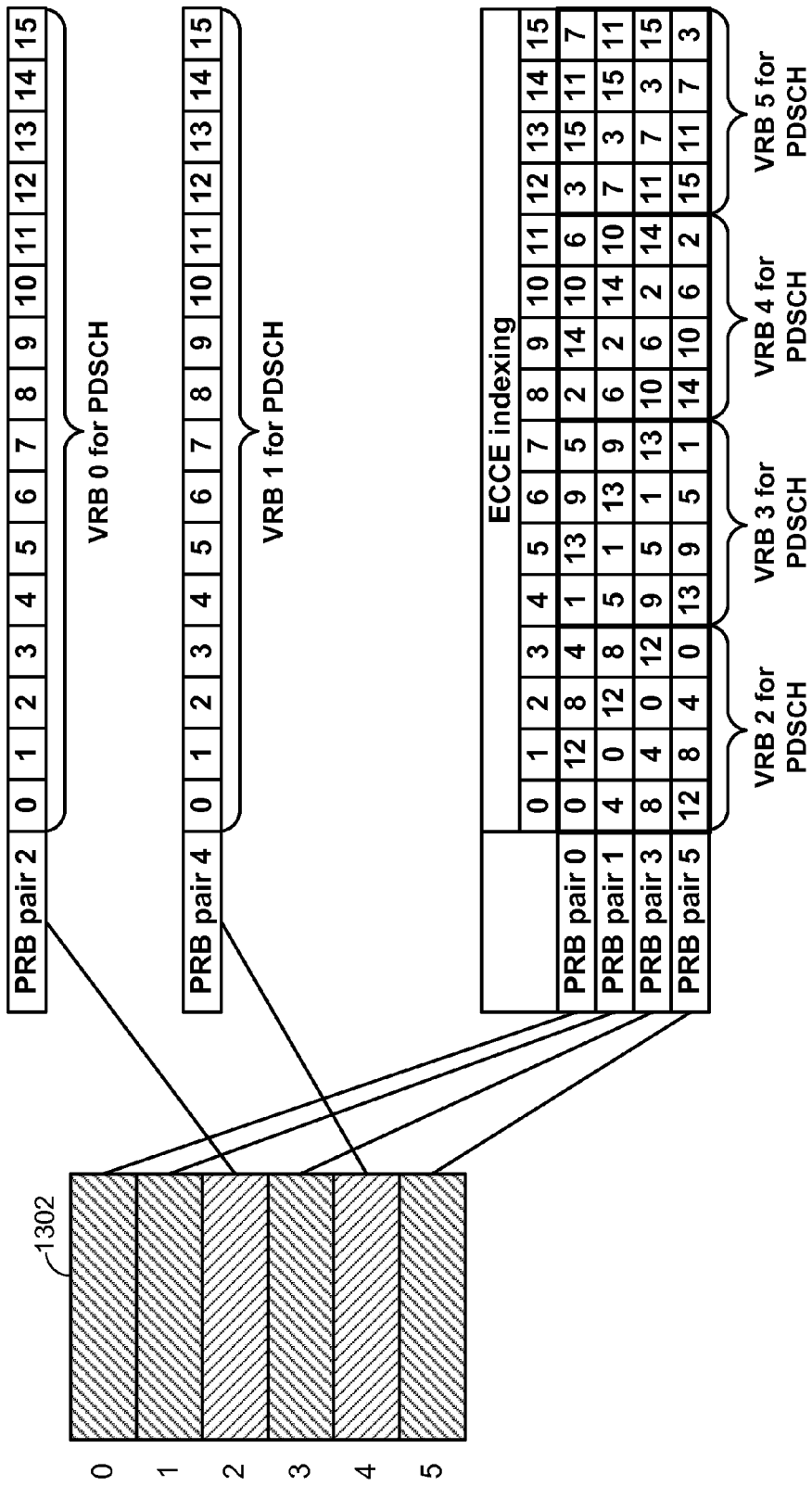
FIG. 13 illustrates example ECCE based PDSCH resource allocation for six PRB pairs organized with two resource sets, in accordance with certain aspects of the present disclosure.

In some embodiments, the two sets may be of different modes (e.g., one localized and one distributed). FIG. 13 illustrates example ECCE based PDSCH resource allocation for six PRB pairs, in accordance with certain aspects of the present disclosure. As seen in FIG. 13, the interleaved PRBs 0-5 include two sets of resources 1302. One set including PRBs 0, 1, 3, and 5, and a second set including PRBs 2 and 4. Resources based on PRB pairs 2 and 4 are in localized mode, and are mapped to VRB 0 and VRB 1, respectively. Whereas, PRBs 0, 1, 3, and 5 are in distributed mode and are mapped to VRBs 2-5, respectively.

Physical Downlink Shared Channel Resource Indication

According to certain aspects, physical downlink shared channel (PDSCH) resource assignments may be indicated in downlink control information (DCI) that indicates a set of virtual resource blocks (VRBs). As discussed above, each VRB is mapped to a set of enhanced control channel elements (ECCEs).

In some embodiments, the resource allocation may be based on a bitmap scheme, virtually contiguous resource allocation scheme, etc. For example, assuming there are 6 VRBs, if a bitmap scheme is used, 6 bits may be used in the DCI, wherein each bit can indicate a VRB. If a virtually contiguous resource allocation scheme is used, 5 bits can be used to indicate one of 21 different combinations (7×6/2=21).

Management of Downlink Resources

According to certain aspects, using an enhanced control channel element (ECCE) based resource allocation (RA) approach, some or all of the downlink system resources may be managed without control channels such as enhanced physical downlink control channel (EPDCCH). For example, blind decoding based physical downlink shared channel (PDSCH) detection may be performed. If there is no restriction on resource allocation, the user equipment (UE) may perform $2^N$ blind decodes under a fixed modulation and coding scheme (MCS), where N is the number of VRBs. If two MCS are possible, the UE may perform $2^N*2(2^{N+1})$ blind decodes. Thus, if N=6, the UE performs 64 blind decodes with a single MCS scheme, compared to 44 or 60 blind decodes for control channels.

According to certain aspects, if there is some restriction on resource allocation (e.g., virtually contiguous resource allocation), the number of blind decodes may be less. In some embodiments, the coding for PDSCH may be based on convolution coding (CC), such as tail-biting CC (TBCC).

Figure 14:
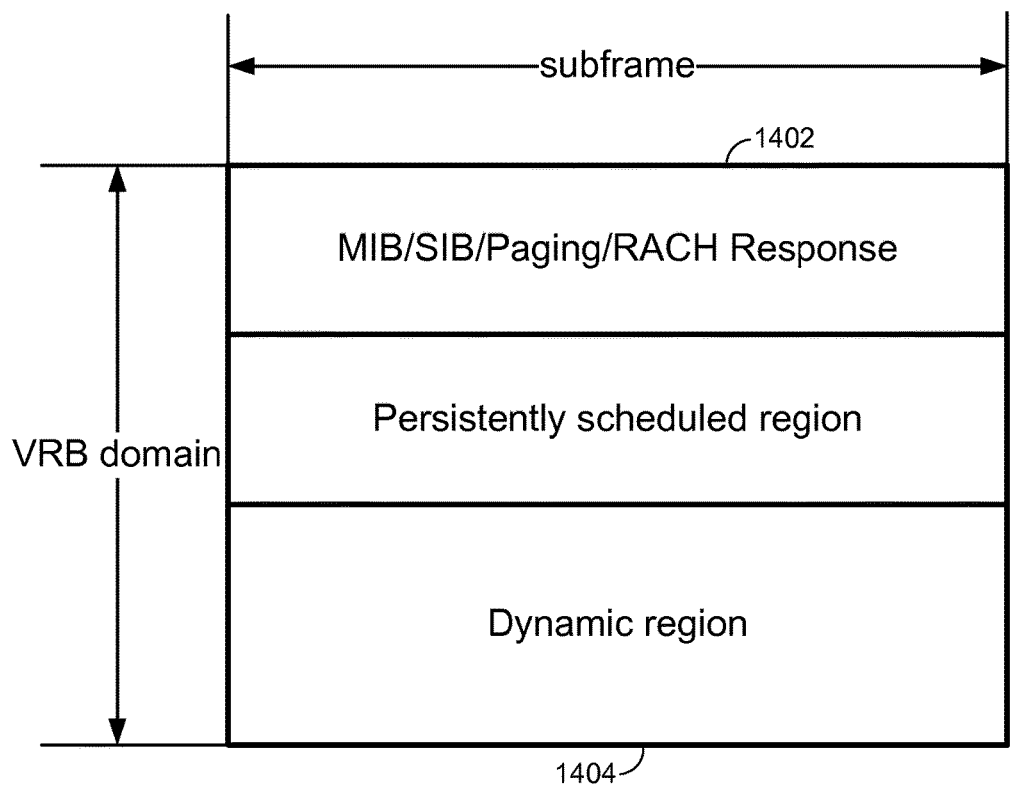
FIG. 14 illustrates an example of known and dynamic regions used for blind decoding, in accordance with certain aspects of the present disclosure.

According to certain aspects, one or more known region and a dynamic region may be used for blind decodes. As seen in FIG. 14, the one or more known regions 1402 may contain a region for master information block (MIB)/system information block (SIB)/paging/random access channel (RACH) response, and possibly some other broadcast messages (e.g., multimedia broadcast multicast service (MBMS) messages). This region may be subframe dependent.

In some embodiments, the known region 1402 may contain a region for persistently or semi-persistently scheduled PDSCH transmissions. The UE does not need to perform blind decodes in this region. This region may be subframe dependent as well, at least from the UE perspective, and it may be UE-specific. The size of each region may be fixed or subframe-dependent.

In some embodiments, the dynamic region 1404 may contain PDSCH transmissions that the UE blindly decodes. Assuming there are 3 VRBs in the dynamic region and 2 possible MCS values, the UE may perform up to 16 blind decodes ($2^3 \times 2=16$). This region may be subframe-dependent (presence and size) and UE-specific.

In some embodiments, some information may be indicated to a UE (e.g., via radio resource control (RRC) configuration) to reduce the number of blind decodes. For example, the UE may be indicated that only up to 2 VRBs PDSCH may be scheduled for the UE. If there are 6 VRBs for dynamic region, the number of blind decodes is 42 ((6+15)*2=42) if there are two possible MCS schemes. As another example, the UE can be indicated which MCS to be used (i.e., 6 possible 1 VRB PDSCH, and 15 possible 2 VRB PDSCH). In this case, with 6 VRBs for dynamic region without any resource allocation limitation, the UE would then have 64 blind decodes ($2^6$), instead of 128 blind decodes (64×2=128). A combination of resource allocation limitation and MCS limitation is also possible.

Figure 15:
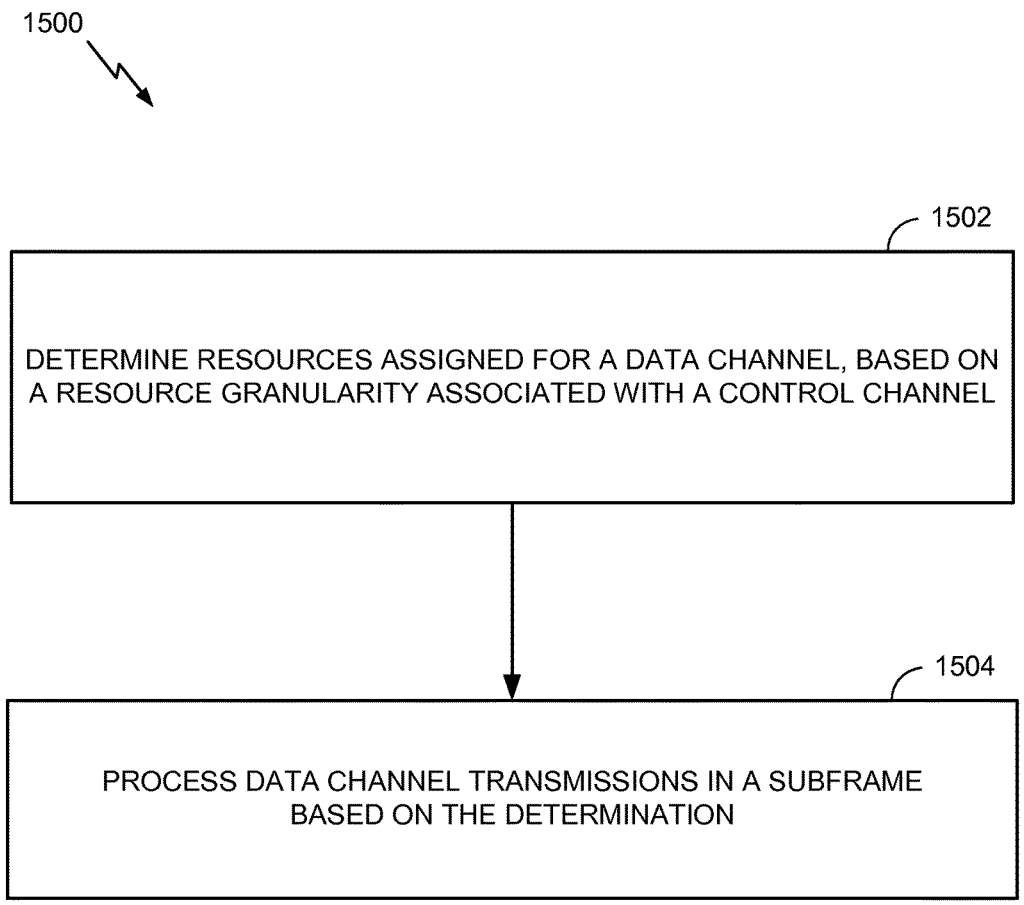
FIG. 15 illustrates example operations for wireless communications by a user equipment (UE), in accordance with certain aspects of the present disclosure.

FIG. 15 illustrates example operations 1500 for wireless communications, in accordance with certain aspects of the present disclosure. The operations 1500 may be performed, for example, by a user equipment (UE) (e.g., a UE 120). The operations 1500 may begin, at 1502, by the UE determining resources assigned for a data channel, based on a resource granularity associated with a control channel. The resource granularity may be a number of one or more enhanced control channel elements (ECCEs). The data channel may comprise a PDSCH. The resources assigned PDSCH may be VRBs comprising a number of ECCEs from the same EREG. ECCEs in a VRB may span multiple PRB pairs or may be within the same PRB pair. According to certain aspects, the UE may receive DCI having bits indicating VRBs each mapped to a set of ECCEs.

According to certain aspects, a subframe may have PRB pairs organized into resource sets and each set may include a different number of PRB pairs. VRBs of at least one of the resource sets may be localized and include ECCEs within the same PRB pair. According to certain aspects, the resource granularity may depend on the number of ECCEs contained in each PRB pair. In some embodiments, the resource granularity is smaller than a PRB pair.

According to certain aspects, the available resources include a first fixed region with information at known locations and a second dynamic region in which the UE performs blind decodes to detect PDSCH. The resources may also include a third region for persistently scheduled PDSCH transmissions. In some embodiments, a size, location, or presence of the regions may be subframe-dependent or UE-specific.

At 1504, the UE processes the data channel transmissions in a subframe based on the determination. According to certain aspects, some of the assigned PDSCH resources may overlap with EPDCCH resources. The UE may perform rate matching around the overlapping EPDCCH resources. According to certain aspects, some PDSCH resources may be assigned without corresponding control channels and the UE may perform blind decoding to decode PDSCH transmissions. In some embodiments, the number of blind decodes performed by the UE may be limited. For example, a restriction may limit resource allocation to virtually contiguous resources.

Figure 16:
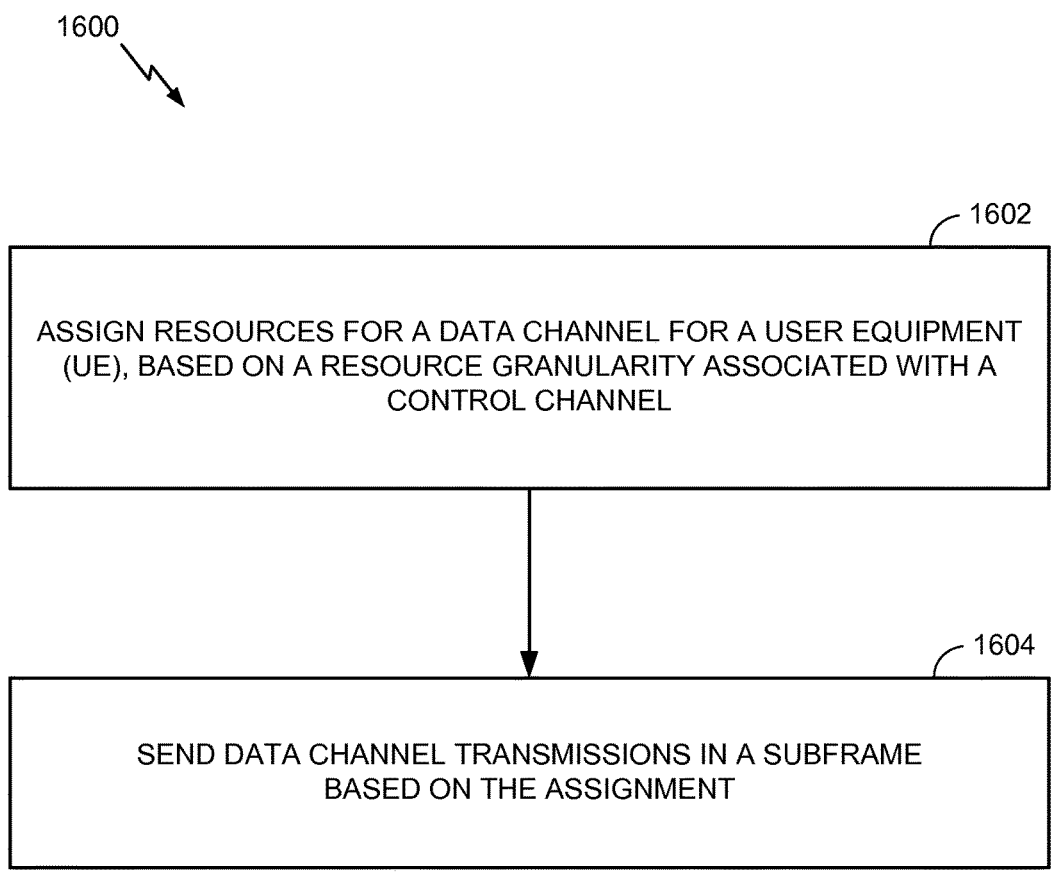
FIG. 16 illustrates example operations for wireless communications by a base station, in accordance with certain aspects of the present disclosure.

FIG. 16 illustrates example operations 1600 for wireless communications, in accordance with certain aspects of the present disclosure. The operations 1600 may be performed, for example, by a base station (BS) (e.g. a eNB 110). The operations 1600 may be begin at 1602 by the BS assigning resources for a data channel for a user equipment (UE), based on a resource granularity associated with a control channel. The resource granularity may be of one or more enhanced control channel elements (ECCEs). At 1604, the BS sends the data channel transmissions in a subframe based on the assignment. The data channel may comprise a PDSCH.

The various operations of methods described above may be performed by any suitable means capable of performing the corresponding functions. The means may include various hardware and/or software/firmware component(s) and/or module(s), including, but not limited to a circuit, an application specific integrated circuit (ASIC), or processor. Generally, where there are operations illustrated in the Figures, those operations may be performed by any suitable corresponding counterpart means-plus-function components.

For example, means for transmitting may comprise a transmitter (e.g., modulator 254 or 232) and/or antenna 252 or 234 of the UE 120 or the base station 110, respectively, as illustrated in FIG. 2. Means for receiving may comprise a receiver (e.g., demodulator 254 or 232) and/or an antenna 252 or 234 of the UE 120 or the base station 110, respectively, as illustrated in FIG. 2. Means for determining and means for processing may comprise a processing system, which may include at least one processor, such as the receive processor 258, the controller/processor 280, and/or the transmit processor 264 of the UE 120 illustrated in FIG. 2. Means for assigning and means for sending may comprise a processing system, which may include at least one processor, such as the transmit processor 220, the controller/processor 240, and/or the receive processor 238 of the base station 110 illustrated in FIG. 2. However, additional or alternative components in FIG. 2 may be employed as the means for transmitting, means for receiving, means for determining, means for processing, means for assigning, and/or means for sending.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or combinations thereof.

Those of skill would further appreciate that the various illustrative logical blocks, modules, circuits, and algorithm steps described in connection with the disclosure herein may be implemented as hardware, software/firmware, or combinations thereof. To clearly illustrate this interchangeability of hardware and software/firmware, various illustrative components, blocks, modules, circuits, and steps have been described above generally in terms of their functionality. Whether such functionality is implemented as hardware or software/firmware depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software/firmware module executed by a processor, or in a combination thereof. A software/firmware module may reside in RAM memory, flash memory, phase change memory (PCM), ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal In one or more exemplary designs, the functions described may be implemented in hardware, software/firmware, or combinations thereof. If implemented in software/firmware, the functions may be stored on or transmitted over as one or more instructions or code on a computer-readable medium. Computer-readable media include both computer storage media and communication media including any medium that facilitates transfer of a computer program from one place to another. A storage medium may be any available medium that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software/firmware is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

As used herein, a phrase referring to "at least one of" a list of items refers to any combination of those items, including single members. As an example, "at least one of a, b, or c" is intended to cover a, b, c, a-b, a-c, b-c, and a-b-c.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communications by a user equipment (UE), comprising:
   determining resources assigned for a data channel, based on an indication of a set of virtual resource blocks (VRBs) assigned for the data channel, each VRB comprising a number of enhanced control channel elements (ECCEs), wherein each of the number of ECCEs for each VRB includes enhanced resource element groups (EREGs) from a same group of EREGs; and
   processing data channel transmissions in a subframe based on the determination.

2. The method of claim 1, wherein each ECCE is mapped to four or six PRB pairs.

3. The method of claim 2, wherein a resource granularity of the VRBs is dependent on a number of ECCEs contained in a PRB pair and on a number of PRB pairs.

4. The method of claim 1, wherein the data channel comprises a physical downlink shared channel (PDSCH).

5. The method of claim 4, wherein:
   at least some of the resources assigned for the PDSCH overlap with resources corresponding to an enhanced physical downlink control channel (EPDCCH); and
   processing PDSCH transmissions in the subframe comprises performing rate matching based on the overlapped resources.

6. The method of claim 4, wherein
   at least some PDSCH resources are assigned without corresponding control channels; and
   processing PDSCH transmissions in the subframe comprises performing blind decoding to decode PDSCH transmissions.

7. The method of claim 1, further comprising:
   receiving the set of one or more VRB in downlink control information (DCI).

8. The method of claim 1, wherein subframes available for the data channel transmissions comprise:
   a first fixed region with information at known locations; and
   a second dynamic region in which the UE performs blind decodes to detect the data channel transmissions.

9. The method of claim 1, wherein:
   the set of VRBs comprises four VRBs; and
   the number of ECCEs comprises six ECCEs.

10. The method of claim 1, wherein:
    the set of VRBs comprises eight VRBs; and
    the number of ECCEs comprises three ECCEs.

11. The method of claim 1, wherein:
    a first set of VRBs comprises a first number of ECCEs that are mapped to two PRB pairs; and
    a second set of VRBs comprises a second number of ECCEs that are mapped to four PRB pairs.

12. The method of claim 11, wherein the PRBs of the first and second sets of VRBs are interleaved.

13. A method for wireless communications by a base station (BS), comprising:
    assigning resources for a data channel for a user equipment (UE), based on an indication of a set of virtual resource blocks (VRBs) assigned for the data channel, each VRB comprising a number of enhanced control channel elements (ECCEs), wherein each of the number of ECCEs for each VRB includes enhanced resource element groups (EREGs) from a same group of EREGs; and
    sending data channel transmissions in a subframe based on the assignment.

14. The method of claim 13, wherein each ECCE is mapped to four PRB pairs.

15. The method of claim 14, wherein a resource granularity of the VRBs is dependent on a number of ECCEs contained in a PRB pair and on a number of PRB pairs.

16. The method of claim 13, wherein the data channel comprises a physical downlink shared channel (PDSCH).

17. The method of claim 16, wherein:
    at least some of the resources assigned for the PDSCH overlap with resources corresponding to an enhanced physical downlink control channel (EPDCCH).

18. The method of claim 16, wherein
at least some PDSCH resources are assigned without corresponding control channels.

19. The method of claim 13, further comprising:
sending downlink control information (DCI) indicating the set of one or more VRBs.

20. The method of claim 13, wherein subframes available for the data channel transmissions comprise:
a first fixed region with information at known locations; and
a second dynamic region in which the UE performs blind decodes to detect the data channel transmissions.

21. The method of claim 20, wherein subframes available for the data channel transmissions further comprise:
a third region for persistently scheduled data channel transmissions.

22. An apparatus for wireless communications by a user equipment (UE), comprising:
means for determining resources assigned for a data channel, based on an indication of a set of virtual resource blocks (VRBs) assigned for the data channel, each VRB comprising a number of enhanced control channel elements (ECCEs), wherein each of the number of ECCEs for each VRB includes enhanced resource element groups (EREGs) from a same group of EREGs; and
means for processing data channel transmissions in a subframe based on the determination.

23. The apparatus of claim 22, wherein each ECCE is mapped to four PRB pairs.

24. The apparatus of claim 22, wherein the data channel comprises a physical downlink control channel (PDSCH).

25. The apparatus of claim 24, wherein:
at least some of the resources assigned for the PDSCH overlap with resources corresponding to an enhanced physical downlink control channel (EPDCCH); and
processing PDSCH transmissions in the subframe comprises performing rate matching based on the overlapped resources.

26. An apparatus for wireless communications by a base station (BS), comprising:
means for assigning resources for a data channel for a user equipment (UE), based on an indication of a set of virtual resource blocks (VRBs) assigned for the data channel, each VRB comprising a number of enhanced control channel elements (ECCEs), wherein each of the number of ECCEs for each VRB includes enhanced resource element groups (EREGs) from a same group of EREGs; and
means for sending data channel transmissions in a subframe based on the assignment.

27. The apparatus of claim 26, wherein each ECCE is mapped to four PRB pairs.

28. The apparatus of claim 26, wherein the data channel comprises a physical downlink control channel (PDSCH).

* * * * *